United States Patent [19]

Small et al.

[11] Patent Number: 5,642,303

[45] Date of Patent: Jun. 24, 1997

[54] TIME AND LOCATION BASED COMPUTING

[75] Inventors: Ian S. Small, Cupertino; Michael Chen, Palo Alto, both of Calif.

[73] Assignee: Apple Computer, Inc., Cupertino, Calif.

[21] Appl. No.: 436,050

[22] Filed: May 5, 1995

[51] Int. Cl.$^6$ ....................................................... G01S 1/68
[52] U.S. Cl. ............................. 364/705.05; 364/514 C; 364/516
[58] Field of Search .......................... 364/514 A, 514 C, 364/516, 705.05; 340/854.6, 981, 983; 455/89

[56] References Cited

U.S. PATENT DOCUMENTS

| | | | |
|---|---|---|---|
| 4,973,952 | 11/1990 | Malec et al. | 340/825.35 |
| 5,008,821 | 4/1991 | Pratt et al. | 364/413.01 |
| 5,440,559 | 8/1995 | Gaskill | 340/825.34 |

OTHER PUBLICATIONS

Getting, Ivan A., "The Global Positioning System", IEEE Spectrum, Dec. 1993, pp. 36–38; 43–47.
Pountain, Dick, "Track People With Active Badges", BYTE, Dec. 1993, pp. 57,58,62,64.
Want, Roy, et al., "The Active Badge Location System" ACM Transactions, Jan. 1992, pp. 91–102.
Want, Roy, et al., "Active Badges And Personal Interactive Computing Objects", IEEE Transactions, Feb. 1992, pp. 10–20.
Texas Instruments Tiris Data Sheet No. 22-25-004, Aug. 1992, "A Little Innovation That Goes A Long Way".
Texas Instruments Tiris Data Sheet No. 22-22-005, May 1992, "Transponder Specification".
Texas Instruments Tiris Data Sheet No. 22-22-027, Dec. 1992, "Glass Capsule Series Transponders".
Texas Instruments Tiris Data Sheet No. 22-22-025, Dec. 1992, "Vehicle & Container Series Cylindrical Transponder".
Texas Instruments Tiris Data Sheet No. 22-22-026, Dec. 1992, "Antenna Specifications".
Texas Instruments Tiris Data Sheet No. 22-22-028, Jan. 1993, "Antenna PO2A Specifications".
Texas Instruments Tiris Data Sheet No. 22-22-005, May 1992, "Stationary Reader Specifications".
Texas Instruments Tiris Data Sheet No. 22-22-024, Dec. 1992, "Read/Write Handheld Reader".
Texas Instruments Tiris Data Sheet No. 22-22-014, Oct. 1992, "Radio Frequency Module Specifications".
Texas Instruments Tiris Data Sheet No. 22-24-011, Dec. 1992, "Application Profile".
Texas Instruments Tiris Data Sheet No. 22-24-018, Mar. 1993, "Application Profile".
Texas Instruments Tiris Data Sheet No. 22-24-008, Dec. 1992, "Application Profile".

*Primary Examiner*—Emanuel T. Voeltz
*Assistant Examiner*—Craig Steven Miller
*Attorney, Agent, or Firm*—V. Randall Gard

[57] ABSTRACT

Utilizing a simple, low-cost beacon and receiver technology to allow users to build their own infrastructure by placing beacons in key locations provides intelligent location awareness. This location awareness can be leveraged by the computer electronic equipment that the user is carrying, needs no networking or server infrastructure, works indoors, has no line-of-sight restrictions, is compact and inexpensive.

24 Claims, 2 Drawing Sheets

TIME AND LOCATION BASED COMPUTING

FIELD OF THE INVENTION

The present invention relates generally to a user's ability to configure an infrastructure and as a result perform time and location based computing.

BACKGROUND OF THE INVENTION

People often make a note of something in order to remember to do it when they get home. Or, when they're at home, they often make lists of things to do when they get to the office. However, they oftentimes forget to look at that note when they get there.

Reminders like these comprise part of a user's to do list. They're different from other to do items because each of these has a location associated with it, and because the user would like to be reminded about them when they get to that location. Users today have a number of strategies for dealing with this problem: they make lists on paper, but sometimes forget to look at the lists; they leave messages on answering machines, but voice messages lack the permanence of paper-based messages and often get forgotten; they ask others to remind them, but the other people sometimes forget as well. Thus, a need exists for better location-based reminding and intelligence.

Many of today's location-based applications rely on the Global Positioning System (GPS) to determine their physical location. GPS determines the user's position by triangulating signals transmitted by a set of satellites constantly orbiting the earth. While GPS works extremely well on a large scale, it has a few problems:

- GPS effectively requires line-of-sight visibility between the GPS antenna and the satellite network, which can be difficult when walking or driving, or when located between tall buildings.
- The GPS antenna is bulky.
- GPS doesn't work as well inside buildings, because of the line-of-sight visibility requirement.
- Civilian GPS is only accurate to hundreds of feet. (Military GPS is much more accurate.)
- GPS is still relatively expensive.

Various research institutes have investigated using location awareness to make people's computing environments adapt. A widely publicized experiment was Rank Xerox EuroPARC's use of Olivetti's Active Badges. At EuroPARC, telephones ring where you are, rather than ringing in your office when you're not there. In addition, you can locate people via these Active Badges. There are, however, some problems with the EuroPARC/Olivetti approach:

- Active badges require a significant infrastructure before they can work. Active badges transmit their locations using an infrared (IR) link. IR receivers located on the ceiling of each office see the active badge's identification transmission, and update a central server with the person's location, which in turn can reroute telephone numbers, etc. Without the receivers in every room, active badges are much less effective.
- Active badges only work in the office complex where the central server infrastructure has been created.
- Active badges create privacy concerns, because the central server is aware of the person's location.
- Active badges need to be worn externally so that line-of-sight connections can be made with the ceiling-mounted IR receivers.
- Only the network and the central server know about the person's location. A computer the person is carrying is unaware of the person's location, so cannot adapt itself based on that location.

AppleLocator technology, the present invention approach, does not attempt to replace these prior technologies or to address all of the problems that they try to solve. Rather, it relies on simple, low-cost technology to provide a basic level of location awareness, which can be leveraged by both embedded and application software in the computer electronics that the user is carrying. In particular:

- There is no networking or server infrastructure required. Each user builds their own infrastructure by placing beacons in key locations, and is also free to leverage beacons placed by others.
- Privacy issues are negated. Only your computer knows where you are-nobody else does. And your computer only knows where you are if you take it with you.
- The technology is designed to work indoors.
- The technology has no line-of-sight restrictions, so it can work even when the host computer has been put away and is contained inside something else.
- The technology is compact.
- The technology is inexpensive.

Further, a key observation which underlies the AppleLocator technology is that for many things in people's lives, knowing about only a few locations is still a significant advance. For instance, rather than knowing that you're within two blocks of a grocery store and you need to buy something, it probably suffices to know that you're on the way home, and be told that there were things that you needed to buy at the store.

SUMMARY AND OBJECTS OF THE INVENTION

It is an object of the present invention to provide an improved location based computing system.

It is a further object of the present invention to provide a location based computing system which can proactively remind users and provide location and time based computing functionality in a user friendly, intuitive manner.

The foregoing and other advantages are provided by a location based portable computing system comprising: i) one or more beacons, each of the one or more beacons transmitting a unique beacon signal, each transmitted unique beacon signal having a transmitting signal range, at least one of the one or more beacons being placeable in a user desired location by a user of the portable computing system; ii) a portable receiver which can receive the transmitted unique beacon signal from any one of the one or more beacons when the portable receiver is located within the transmitting signal range of any one of the one or more beacons; iii) a portable computing host coupleable to the portable receiver such that the portable receiver can provide a notification to the portable computing host of which one of the one or more transmitted unique beacon signals the portable receiver received when the portable receiver receives any transmitted unique beacon signal from any one of the one or more beacons; and iv) the portable computing host being user programmable to perform a predetermined function based upon the portable receiver providing the notification to the portable computing host of which one of the one or more transmitted unique beacon signals the portable receiver received.

The foregoing and other advantages are also provided by a location based portable computing method comprising: i)

placement of one or more beacons in one or more user desired locations by a user of the portable computing system, each of the one or more beacons transmitting a unique beacon signal and having a transmitting signal range; ii) receiving the transmitted unique beacon signal from any one of the one or more beacons by a portable receiver located within the transmitting signal range of any one of the one or more beacons; iii) coupling a portable computing host to the portable receiver; iv) the portable receiver providing a notification to the portable computing host of which one of the one or more transmitted unique beacon signals the portable receiver received when the portable receiver receives any transmitted unique beacon signal from any one of the one or more beacons; and, v) user programming the portable computing host to perform a predetermined function based upon the portable receiver providing the notification to the portable computing host of which one of the one or more transmitted unique beacon signals the portable receiver received.

Other objects, features and advantages of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE INVENTION

Figure 1:
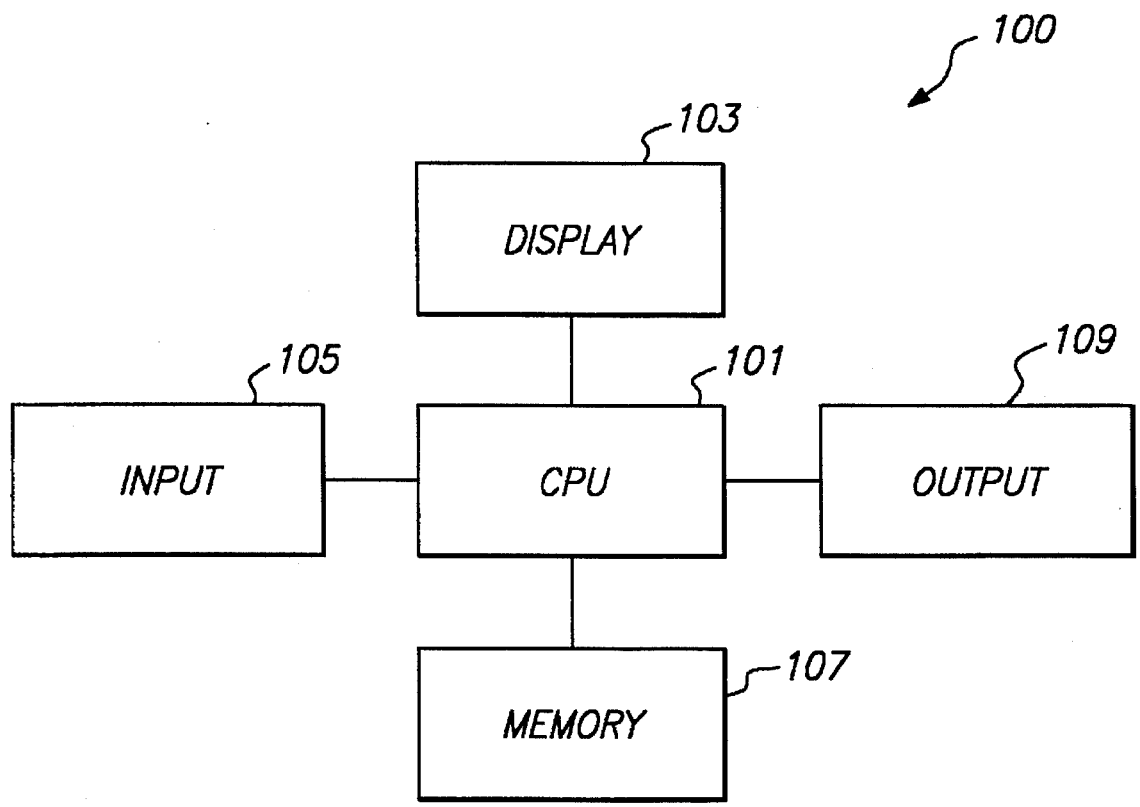
FIG. 1 is a simplified block diagram of a computer system utilized by the present invention; and, FIG. 2 depicts one likely usage scenario for a typical user of the present invention.

The present invention will be described below by way of a preferred embodiment implemented using an Apple® Newton® (trademarks of Apple Computer, Inc.) Personal Digital Assistant (PDA) or Apple® Macintosh® Powerbook® (trademarks of Apple Computer, Inc.) computer system. It is to be noted, however, that this invention can be implemented on other types of host computers and electronic devices and systems. Regardless of the manner in which the present invention is implemented, the basic operation of a computer system 100 employing the present invention, including the software and electronics which allow it to be performed, can be described with reference to the block diagram of FIG. 1, wherein numeral 101 indicates a central processing unit (CPU) which controls the overall operation of the computer system, numeral 103 indicates a display device such as a liquid crystal display (LCD) screen or other display device, numeral 105 indicates an optional input device which may include both a standard keyboard and a hand-held stylus or a pointer-controlling device such as a mouse or trackpad as well as a microphone or other sound input device, numeral 107 indicates a memory device which stores programs according to which the CPU 101 carries out various predefined tasks, and numeral 109 indicates an output device such as a loudspeaker used in lieu of or in addition to display screen 105 which is also used as an output device by displaying relevant information to the user of the computer system 100.

In the preferred embodiment, AppleLocator technology is generally comprised of three components:

independent radio frequency (RF) beacons, which are placed (or, in the case of previously placed beacons, identified) by the user in key locations and which transmit unique identifiers, an RF receiver, which plugs into the user's portable computer or PDA, and which alerts the computer when it comes within range of a known beacon, and software which leverages the resulting location information.

By placing multiple beacons in key locations (the user's home, office and car, for instance), each user can build a custom infrastructure for making their computer location-aware. Users can also leverage the existence of beacons installed by others, as appropriate. Each user can create their own descriptions for beacon locations, thus allowing different users to describe the same location differently. Beacons which haven't been formally introduced to the user's computer or PDA are simply ignored by the receiver or by the software.

Once the user has created their own infrastructure, a number of things become possible. For example, a Newton-based to do list could proactively remind the user of things which need to be done when the user reaches the office. This would be accomplished by having the user simply select from a list of locations known to their Newton when they enter a to do item, and their Newton would then know to remind them when they are next at that location. An advanced to do list manager could key items to date, time and location, as well as working in concert with the Newton calendering functionality.

Newton's assistance capability can become more powerful as it becomes location aware. For instance, Newton could remind the user that there are documents waiting to be printed or faxed when the user is in a location where these facilities are available. The same strategy applies to power charging: if power is running low and the user's PDA is in a location where power is available, it could ask the user to be plugged in.

PDAs are not the only platform for which AppleLocator technology is appropriate. PowerBooks could offer different desktop or workspace configurations depending upon their location. For example, a PowerBook could be configured to launch At Ease (a simplified user interface typically used by families with small children) at home, but the full Finder interface (a more extensive, powerful user interface) elsewhere. At the office, the appropriate set of working documents could automatically be displayed when the user arrives at a regular weekly meeting. And print spooling reminders are just as valid for PowerBooks as for Newtons.

The actual RF beacon and receiver technology is itself simple to build, and power consumption at both ends can be expected to be extremely low. Implementations of the underlying beacon and receiver technology are well known in the art as evidenced by the Texas Instruments Registration and Identification System TIRIS™ product overview and data sheets (numbered 22- 22-005, 22-24-011, 22-22-014, 22-22-024, 22-22-025, 22-22-026, 22-22-028, 22-24-008, 22-25-004, 22-25-005, and 22-25-027, all dated 1992, and 22-24-018 dated 1993) disclosed herewith and incorporated herein by reference in their entirety.

Location-Based Computing

AppleLocator technology enables a new class of application software and operating system components hereinafter called location-based computing. The examples below describe some of the possibilities.

Proactive Reminding

If the user's portable computer or personal digital assistant maintained their to do list, and was aware of its location as it was carried around, it could proactively remind the user of the to do items which need to be carried out in various environments.

Figure 2:
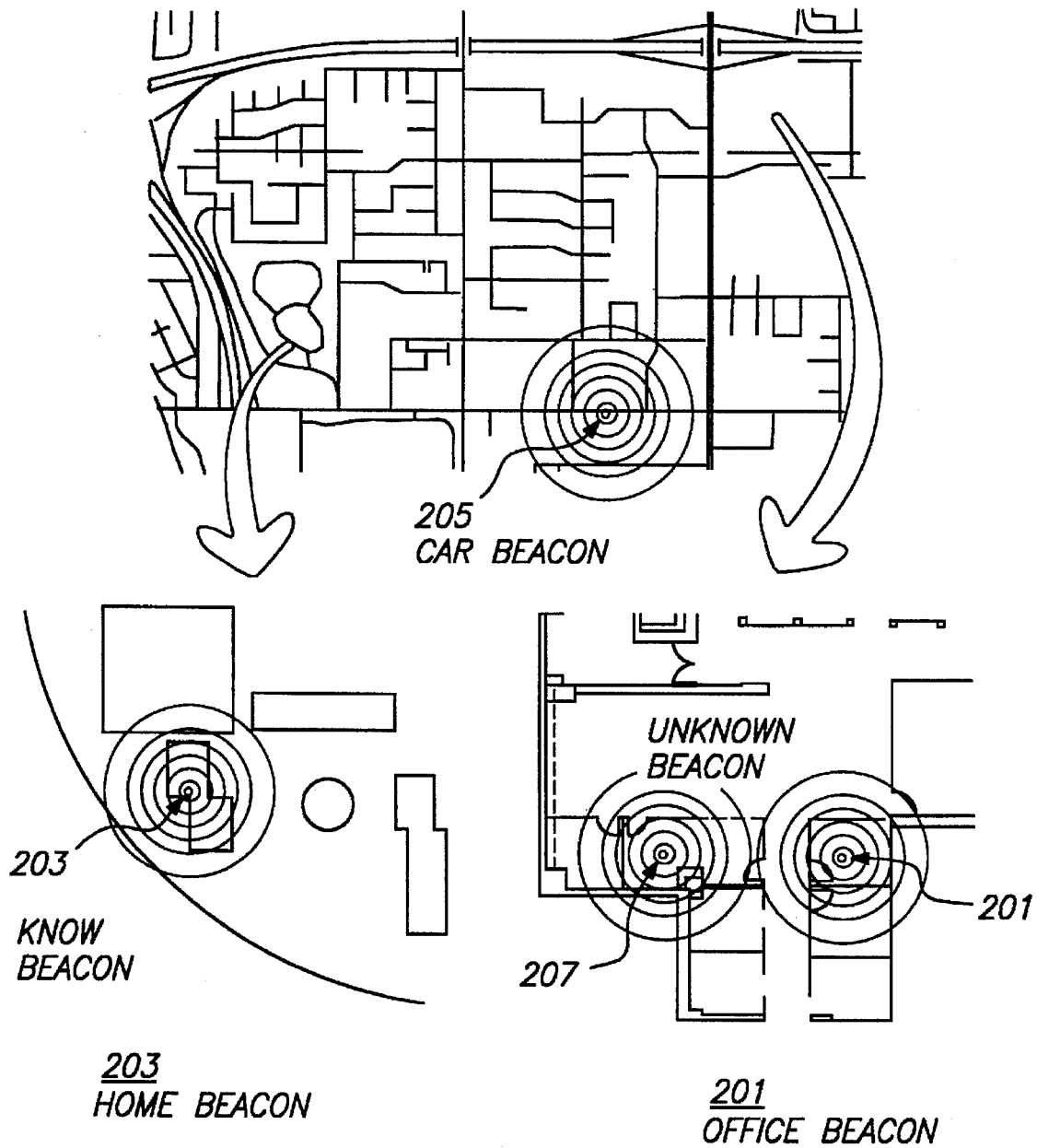

Referring now to FIG. 2, three environments most users would likely establish in their personal infrastructure would be their office (beacon 201), their home (beacon 203) and their car (beacon 205). The latter location, beacon 205, is particularly valuable because it allows the user to create reminders "on the way home", "on the way to work", etc. In all cases, cross-referencing the user's location with their calendar can yield interesting results.

Users can share infrastructures as well. In particular, two people who live in the same house can take advantage of the same beacon to make their individual computers location-aware. Furthermore, there are commercial applications of the technology. A grocery store or shopping mall might elect to install a beacon in the store or in the mall so that users could create reminders or to do items for that store or shopping mall. Because the user is responsible for describing each location, they can also describe multiple grocery stores as "grocery store", thereby being able to create reminders that will pop up the next time they are in a grocery store, no matter which particular grocery store the user is in.

Finally, because the user establishes their own infrastructure, it is easy to create temporary infrastructures to suit changing environments. In particular, a user who travels might want to establish a beacon in their hotel room, or in their rental car, in order to be able to use their reminding capability on the road. Furthermore, the user may wish to record location-based to do items for a road trip before the infrastructure is even established. The software could easily support this kind of location "look-ahead".

Operating System Extensions

Portable computers and PDAs both allow users to select documents and messages for later printing, faxing or mailing. Once spooled, these documents sit in the appropriate queues, waiting for the host to be connected to the appropriate network service and then to be dispatched. Unfortunately, once the user has initially dealt with a document, they tend to forget about it, and the document may end up sitting in that queue for much longer than intended.

Herein is a simple solution to this problem. As the user creates their location infrastructure, they also instruct the host unit about the availability of network services in each location. This database can be correlated with the user's current location to prompt the user to connect the host to the appropriate service so that the spooled items can be dispatched. If the document were to be printed, it could automatically be printed at the appropriate printer for that location. This strategy results in documents being printed, messages being faxed, and mail being sent as soon as possible, rather than gathering dust for days waiting to be dispatched.

The database which relates service availability to location can also be used for other tasks. For instance, rather than simply telling the user that power is running low, the host computer system could notice that its battery is at half charge, that it is early in the day (and that it is unlikely to make it through the afternoon), and proactively ask the user to be charged when it is in a location where there is a dock or power plug (e.g., while in the user's office) and when there isn't anything coming up on the user's calendar. This opportunistic charging strategy should reduce the number of times the host actually runs out of power.

Beacon and service databases can also be provided by central organizations. For instance, a company could locate a beacon in each of its conference rooms, and provide a database which lists the closest available printer for each conference room. A user who wishes to print something from a conference room would then automatically have it printed at the closest printer and, further, the user's host could inform the user where that printer is located by looking in the same printer database.

Workspace Computing

A computer's location could be used to change its overall setup. For instance, users may want to have different desktop or user interface arrangements at home and at the office. At home, they may want the system to run At Ease so that their children cannot access any of the work-related files stored on the system, while at the office, the standard Finder may be more appropriate. Dockable computers may have different hardware and screen configurations in different locations. The computer could have multiple setups programmed so that the correct networking interface, application software and desktop arrangements are automatically used in different locations.

More powerfully, the host computer could integrate knowledge of the user's calendar with knowledge of the user's location to provide context-sensitive workspaces. In particular, if the host can tell from the calendar that the user is supposed to be participating in a regular weekly meeting, and the user is in the right location for that regular weekly meeting, it can automatically bring up the set of files or documents appropriate to that meeting.

Vertical Applications

While one of the AppleLocator technology's strengths is that people can build their own infrastructures, large institutions can also build a significant AppleLocator infrastructure on which some of their services might depend. In particular, companies, hospitals and hotels with sprawling complexes could create a beacon infrastructure which would assist people in navigating. By providing guests with a PDA containing the beacon database at check-in time, the hotel enables guests to easily find their room, the exercise facilities, etc. The same is true of hospitals and other large institutions in which people frequently get lost. If the user already has an AppleLocator-equipped PDA, the institution simply transfers the beacon database and accompanying way finding software to that host computer platform.

Museums could use AppleLocator technology to provide interactive tours of their galleries. As visitors approach displays, an interactive guide could automatically appear on the host platform's display, or a description could be read to the user using text-to-speech synthesis. If the visitor describes their interests and background to the host before starting to wander the gallery, the host can also tailor its explanations, and make particular recommendations to the visitor. Further, with the low cost and flexibility of the Applelocator technology, not only could a visitor's host be specially tailored to the particular visitor, it would also be an easy matter for the museum to regularly update and modify their infrastructure by merely adding or moving beacons.

By setting up large infrastructures, corporations and institutions can develop new uses for AppleLocator technology. Users who already have AppleLocator-equipped hosts can take advantage of these existing infrastructures once they have acquired the beacon database and the appropriate application software; others can rent or borrow the appropriate host for the duration.

How Does AppleLocator Technology Work?

Each user can create their own AppleLocator infrastructure by acquiring AppleLocator beacon units and placing them in key locations. Every beacon transmits over a short distance on the same fixed radio frequency. Each beacon is pre-programmed with a single fixed multi-bit unique identifier, which it transmits at semi-regular, relatively infrequent intervals, for example once every fifteen seconds. Beacons either plug into the wall or are battery powered.

The user then programs the identification code of each desired beacon into their computer or PDA when the beacon is first acquired. This could be done simply by entering into the user's computer the identification code printed on the outside of the beacon or by instructing the computer to "listen" for a nearby transmitting beacon or while a button is pressed on the beacon which causes the beacon to transmit its identifying code more frequently. Once a beacon's identification code has been acquired by the user's computer, the user associates the beacon's code with a more user-oriented description: "Home" or "Office", for example.

The AppleLocator receiver is the unit which attaches to the user's portable computer or PDA, through a PCMCIA slot, a serial connection or other convenient means (including possibly hardwired into the user's computer system). The receiver is responsible for listening for beacon signals, and passing hem along to the host computer.

As the user moves around, carrying the host computer with them, the host is continuously updated with new locations. Beacons which are not known by the host are received, but because they haven't been identified to the host are generally ignored. Both embedded and application software can leverage the resulting location-awareness.

Note that some potentially complicating issues are resolved by the simplicity of the Applelocator technology:

Because the transmission radius of each beacon is not carefully controlled (although they are relatively small), it is more than possible that two beacons will overlap, especially if two adjacent offices have beacons in them (e.g., beacons 201 and 207 of FIG. 2). Overlap itself, however, is not a problem, because the user would likely not have programmed the beacon 207 from the neighboring office into their host, so its transmissions would be ignored.

Because the beacon transmissions leak beyond office boundaries (e.g., beacon 201 of FIG. 2), the host may think it is in a location when it is in fact just passing by. This problem can be reduced by introducing a slight delay into the recognition code, requiring the host to see multiple transmissions from the same beacon before the host declares that it is actually in the new location. In this case, the application software might be able to distinguish between being "near my office" and being "in my office". In reality, however, the leakage may be more of a benefit than a problem: being reminded of things you need to do in your office when you're just passing by, or when you're standing in the hall next to your office, could be equally valuable. This variability of desired approaches furthers supports a multiplicity of uses for the AppleLocator technology.

While closely located beacons may interfere with each other during transmissions (again, see beacons 201 and 207 of FIG. 2), this is unlikely due to the relatively large time between transmissions and the small transmission radius of the beacons. Furthermore, by changing the time between beacon transmissions randomly (or, merely via periodicity variations in the electronics), only one or two simultaneous beacon transmissions in a row are likely to be corrupted.

Having the beacons transmit only identification codes rather than more complicated descriptions not only simplifies the beacons, but also allows the user to describe a location in terms appropriate to them. Different users are free to describe the same location in different ways: while a user's manager might describe their office to their computer as "my office", the user would probably describe it to their computer as "my manager's office". This is important in multi-lingual situations as well.

Multiple locations can be described in the same way, allowing users to easily create reminders which trigger when they are in any one of the locations. This is particularly interesting for commercial applications, when users may be more interested in the generic nature of the store ("grocery store") rather than in the particular store ("Bob's Market").

Because adjacent beacons are unlikely to interfere with each other, it becomes possible to nest beacons to build hierarchical location beacons. For instance, a large company could locate a high-power beacon in each of its building for employees to use in identifying their place of "work". Within that "work" context, the beacon identifying "your office" would still function properly. In this scenario, the user's computer could be simultaneously aware that it is in "your office" and at "work", as well as just being aware that it was at "work" when the user was somewhere else in the building. This is also effective for commercial applications (stores are contained within malls, and the user may wish to associate items with the mall rather than with particular stores, all of which may not yet be known to their computer).

Simple audible alarms similar to those used by smoke detectors can be used to signal that battery power is running low in beacons; this may also be appropriate for receivers.

There are tradeoffs between the frequency of beacon broadcasts, the likelihood of interference between adjacent beacons, and the resultant power consumption in the receiver. The more frequently a beacon broadcasts, the faster a host can determine that it is in a new location. At the same time, the more frequently beacons broadcast, the more collisions between adjacent beacons there will be. Further, the more frequently beacons broadcast, the more frequently a receiver will have to evaluate beacon transmissions, and consequently the more power that receiver will consume. It seems that a fifteen to thirty second lag in identifying a new location is probably acceptable and indeed probably transparent to the user.

It is possible that some aspects of this technology may be superseded by some wireless networking solutions. In particular, wireless connections may allow users to determine at some granularity where they are by analyzing which part of the network they are connected to.

Receiver Feature Set

In the simplest scenario, the receiver informs the host computer every time it hears a beacon signal, or perhaps every time it hears a different beacon signal. In either case, the host is responsible for determining whether or not it knows the beacon, as the receiver could be hearing a beacon that was installed by some one else, and is not meaningful to this user. If the beacon is in fact known, the host then determines whether there are any tasks such as reminding, printing, etc., that should be triggered based on the new location, and triggers them appropriately. This may involve using audio prompts to notify the user of an outstanding action (particularly important if the host is not the focus of the user's attention). Of course, this receiver implementation, although simple, has implications on power consumption. In particular, this type of implementation could further limit the battery life of a PDA.

Fortunately, there are ways to address receiver/processing power and battery consumption issues. By shifting more up-front processing into the receiver, power consumption in the host should be improved. If a battery and a low-power integrated controller were included in the receiver, it could do a substantial amount of processing itself before requiring the host's attention. One implementation would program the controller with the identification codes of the known beacons, and would then only inform the host about known beacons, ignoring the rest. This would free the host from performing basic recognition duties, and would reduce power consumption.

Another implementation would involve not only programming the controller with identification codes, but also with the outstanding places and times which have triggers associated with them. In this case, when the receiver heard a beacon, it would first determine if it knew that beacon, and if it did, whether or not there were any items waiting on that location (and possibly, that time). While this approach would generally require the host to update the trigger list in the receiver whenever it was changed in the host, it frees the host from evaluating whether or not it should be triggering something based on the current location, thereby achieving significant processing and power savings. In this approach, the host would only be activated when something actually needed to be done, rather than expending processing and power needlessly. In most situations, the host could remain asleep or working on other operations, and would only be woken or alerted if necessary.

Another variation on the receiver's feature set is particularly useful in PDAs like the Newton where PCMCIA slots are at a premium. Occupying the slot continuously with an AppleLocator receiver is expensive, from both a resource and a flexibility standpoint. Fortunately, the battery-powered receiver described above does not need to be plugged into the host in order to function. By adding a small speaker and/or LED to the receiver, it could notify the user both audibly and/or visually when it needs to be plugged in. Once the user plugs the receiver into their PDA, the appropriate event on the PDA can be triggered and the associated action taken. If the user doesn't care to plug the receiver into their PDA, they can simply ignore it. This implementation is similar in spirit to a Newton pager. Of course, this does add one complication: because the receiver is not continuously plugged into the host computer system, it cannot be as easily updated by the host when new location-based actions are programmed. However, effective use of alerts on the host is probably an adequate solution to this problem.

It may be desirable to recharge the receiver battery when the host is recharging. Whether or not to do this will generally be a function of the receiver's battery life: if the batteries which are used are capable of lasting a relatively long time, the user probably doesn't need to bother recharging them.

Software

The software development for AppleLocator technology has two components in the preferred embodiment:
  operating system extensions,
  application software.

As described above, operating system extensions for the various platforms that can host AppleLocator receivers would likely include the following key modules:
  A database relating beacon identification codes to user descriptions of each location. Accesses and updates would be keyed both by identification code and by user description. The database would be extensible to include things such as the network services, power charging facilities and peripheral hardware found at each location. The update methods would allow easy merging of databases.

A location manager which maintains a database of locations and times which will trigger other events on the host, and which is responsible for communication between the receiver and the host.

A utility program which allows users to add new beacons and their associated descriptions and other data to the location infrastructure.

These applications should be based on user-centered design principles, allowing users to, for example:
  keep multiple to do lists,
  assign priorities to lists or items,
  key reminders to locations, places and/or people,
  key reminders to the user's calendar, if available, and
  review accomplished items.

The process of reminding users should be as painless as possible. The use of appropriate audio cues is particularly valuable if the computer is not the user's current focus of attention. Rather than relying on a simple beep to remind the user, it would be preferable to encode some context into the audio warning. A contextual audio reminder may be sufficient to trigger the user's memory, thereby removing the need for them to actually look at the host's screen and read a reminder message. It is easy to imagine different cues for different types of reminders, for example, slight coughing for user-generated reminders, printing sounds to remind the user that something is waiting to be printed, some electrically-oriented sound for power charging, etc.

The actual reminding process would learn over time about the user's habits and adapt to them. For instance, if the user normally starts charging their PDA shortly after entering their office, the PDA should not remind them to do so until it is clear that the user has forgotten. If the unit often reminds or prompts the user about things the user was about to do anyway, the user's perception will shift from a machine which assists them to one that nags them, an undesirable development. This can be avoided by having the PDA learn about the users location-based behavior over time. This learning process may best be implemented as a separate operating system level module.

As the host becomes more and more knowledgeable about the user's location-based behavior, it becomes possible for the host to help in new and interesting ways. For instance, if the host tracks home-car-office and office-car-home location patterns, it can generate a model of when the user normally goes to work and goes home. This knowledge can then be applied to other applications: for instance, the host might automatically remind the user during the evening of a particularly early meeting the next morning, if the user wouldn't normally be at the office at that time and they hadn't looked at their calendar that night. Similarly, the office-car-home pattern can be used to determine that the user is likely on the way home, and should be reminded of the tasks that need to be accomplished during that journey (stopping at the grocery store, picking up a video, etc.).

There can be a range of receivers:
  a low-end receiver which needs to be connected to the host computer in order to work,
  a mid-range receiver which can function while separated from the host, and
  a high-end receiver which not only functions while separated from the host, but also contains a display such as a one-line LCD on which the user can read reminders without needing to plug the receiver back into the host.

While these receivers are generally presumed to be PCMCIA cards, there can also be receivers which plug into serial ports or have other connection strategies.

In addition to multiple receiver configurations, there can be multiple beacon configurations:

- a DC-powered or battery-powered low-range beacon, suitable for car or mobile use,
- an AC-powered low-range beacon, suitable for office or home use, and
- an AC-powered higher-range beacon, suitable for commercial use in stores, malls, etc.

What Does It Cost?

The basic technology utilized by beacons and receivers is extremely simple to build, and is in fact already in use for such applications as the remote locking controls for luxury cars. Based on off-the-shelf technology the electronic parts cost for a low-range battery-powered beacon should be less than $5. While receiver RF components should be in the same range, utilizing an embedded controller and the PCMCIA form factor would likely raise the receiver's overall cost. Similarly, AC-powered beacons will require an AC transformer, and will be more expensive.

In the foregoing specification, the present invention has been described with reference to a specific exemplary embodiment and alternative embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

What is claimed is:

1. A location based portable computing system comprising:
   - one or more beacons, each of the one or more beacons transmitting a unique beacon signal, each transmitted unique beacon signal having a transmitting signal range, at least one of the one or more beacons being placeable in a user desired location by a user of the portable computing system;
   - a portable receiver which can receive the transmitted unique beacon signal from any one of the one or more beacons when the portable receiver is located within the transmitting signal range of any one of the one or more beacons;
   - a portable computing host coupleable to the portable receiver such that the portable receiver can provide a notification to the portable computing host of which one of the one or more transmitted unique beacon signals the portable receiver received when the portable receiver receives any transmitted unique beacon signal from any one of the one or more beacons; and
   - the portable computing host being user programmable to configure the user's portable computing host based upon the portable receiver providing the notification to the portable computing host of which one of the one or more transmitted unique beacon signals the portable receiver received.

2. The location based portable computing system of claim 1 wherein the placeable beacon user desired location is in the user's office.

3. The location based portable computing system of claim 1 wherein the placeable beacon user desired location is in the user's home.

4. The location based portable computing system of claim 1 wherein the placeable beacon user desired location is in the user's car.

5. The location based portable computing system of claim 1 wherein the portable computing host coupleable to the portable receiver is via a PCMCIA card.

6. The location based portable computing system of claim 1 wherein the portable computing host coupleable to the portable receiver is via a hardwired connection.

7. The location based portable computing system of claim 1 wherein the portable computing host coupleable to the portable receiver is via a serial connection.

8. The location based portable computing system of claim 1 wherein the programmable portable computing host is programmed to configure the user's portable computing host in a simplified user interface.

9. The location based portable computing system of claim 1 wherein the programmable portable computing host is programmed to configure the user's portable computing host in a full featured user interface.

10. The location based portable computing system of claim 1 wherein the programmable portable computing host is programmed to configure the user's portable computing host to make available to the user one or more working documents.

11. The location based portable computing system of claim 1 wherein the programmable portable computing host is programmed to configure the user's portable computing host to launch one or more application programs.

12. The location based portable computing system of claim 1 wherein the programmable portable computing host is programmed to configure the user's portable computing host to make one or more network connections.

13. A location based portable computing method comprising:
   - placement of one or more beacons in one or more user desired locations by a user of the portable computing system, each of the one or more beacons transmitting a unique beacon signal and having a transmitting signal range;
   - receiving the transmitted unique beacon signal from any one of the one or more beacons by a portable receiver located within the transmitting signal range of any one of the one or more beacons;
   - coupling a portable computing host to the portable receiver;
   - the portable receiver providing a notification to the portable computing host of which one of the one or more transmitted unique beacon signals the portable receiver received when the portable receiver receives any transmitted unique beacon signal from any one of the one or more beacons; and,
   - user programming the portable computing host to configure the user's portable computing host based upon the portable receiver providing the notification to the portable computing host of which one of the one or more transmitted unique beacon signals the portable receiver received.

14. The location based portable computing method of claim 13 wherein the placement of the one or more beacons in one or more user desired locations is in the user's office.

15. The location based portable computing system of claim 13 wherein the placement of the one or more beacons in one or more user desired locations is in the user's home.

16. The location based portable computing system of claim 13 wherein the placement of the one or more beacons in one or more user desired locations is in the user's car.

17. The location based portable computing system of claim 13 wherein the coupling of the portable computing host to the portable receiver is via a PCMCIA card.

18. The location based portable computing system of claim 13 wherein the coupling of the portable computing host to the portable receiver is via a hardwired connection.

19. The location based portable computing system of claim 13 wherein the coupling of the portable computing host to the portable receiver is via a serial connection.

20. The location based portable computing method of claim 13 wherein programming the portable computing host configures the user's portable computing host in a simplified user interface.

21. The location based portable computing method of claim 13 wherein programming the portable computing host configures the user's portable computing host in a full featured user interface.

22. The location based portable computing method of claim 13 wherein programming the portable computing host configures the user's portable computing host to make available to the user one or more working documents.

23. The location based portable computing method of claim 13 wherein programming the portable computing host configures the user's portable computing host to launch one or more application programs.

24. The location based portable computing method of claim 13 wherein programming the portable computing host configures the user's portable computing host to make one or more network connections.

* * * * *